United States Patent
Jun et al.

(10) Patent No.: US 12,034,465 B2
(45) Date of Patent: Jul. 9, 2024

(54) ELECTRONIC DEVICE AND METHOD FOR CONTROLLING A TRANSMISSION POWER OF A COMMUNICATION MODULE

(71) Applicant: Samsung Electronics Co., Ltd., Gyeonggi-do (KR)

(72) Inventors: Intae Jun, Gyeonggi-do (KR); Eunki Na, Gyeonggi-do (KR); Cheoleun Heo, Gyeonggi-do (KR); Jaeyoung Roh, Gyeonggi-do (KR); Kyungwan Han, Gyeonggi-do (KR); Jiwoo Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 339 days.

(21) Appl. No.: 17/591,915

(22) Filed: Feb. 3, 2022

(65) Prior Publication Data
US 2022/0239320 A1    Jul. 28, 2022

Related U.S. Application Data

(63) Continuation of application No. PCT/KR2022/000928, filed on Jan. 18, 2022.

(30) Foreign Application Priority Data

Jan. 25, 2021    (KR) .................. 10-2021-0010342

(51) Int. Cl.
*H04B 1/04*    (2006.01)
*H01Q 1/24*    (2006.01)
(Continued)

(52) U.S. Cl.
CPC .......... *H04B 1/0458* (2013.01); *H01Q 1/243* (2013.01); *H04B 5/22* (2024.01); *H04B 5/73* (2024.01);
(Continued)

(58) Field of Classification Search
USPC ....................................... 455/552.1
See application file for complete search history.

(56) References Cited

U.S. PATENT DOCUMENTS

| 7,663,893 | B2 | 2/2010 | Yamashita |
| 9,906,256 | B2 | 2/2018 | Prendergast et al. |
| (Continued) | | | |

FOREIGN PATENT DOCUMENTS

| CN | 210744172 | 6/2020 |
| KR | 1020110030534 | 3/2011 |
| (Continued) | | |

OTHER PUBLICATIONS

International Search Report dated Apr. 25, 2022 issued in counterpart application No. PCT/KR2022/000928, 11 pages.

*Primary Examiner* — Suhail Khan
(74) *Attorney, Agent, or Firm* — The Farrell Law Firm, P.C.

(57) ABSTRACT

An electronic device is provided. The electronic device includes a housing; a first antenna for transmitting and receiving at least one of a first wireless transmission signal and a first wireless reception signal using the first portion of the housing; a first PCB electrically connected to the first antenna and including a first connector; a second PCB electrically connected to the first PCB and including a second connector; a signal connection member having a first end connected to the first connector and a second end connected to the second connector; a communication module electrically connected to the second connector and controlling the at least one of the first wireless transmission signal and the first wireless reception signal; a sensor module which is electrically connected to the second connector, and adjusts at least one sensing parameter based on frequency information of the at least one of the first wireless transmission signal and the first wireless reception signal, (Continued)

and measures capacitance for a path of the at least one of the first wireless transmission signal and the first wireless reception signal between the first antenna and the second connector; and a processor configured to control the transmission power of the communication module according to the capacitance measured by using the sensor module.

20 Claims, 10 Drawing Sheets

(51) Int. Cl.
  *H04B 5/22* (2024.01)
  *H04B 5/73* (2024.01)
  *H04W 52/22* (2009.01)
(52) U.S. Cl.
  CPC ... *H04W 52/226* (2013.01); *H04B 2001/0416* (2013.01)

(56) References Cited

U.S. PATENT DOCUMENTS

| | | |
|---|---|---|
| 11,217,875 B2 | 1/2022 | Kim et al. |
| 2009/0305742 A1 | 12/2009 | Caballero et al. |
| 2012/0071195 A1 | 3/2012 | Chakraborty et al. |
| 2017/0289929 A1* | 10/2017 | Komulainen ............ G01V 3/08 |
| 2019/0067801 A1 | 2/2019 | Kang et al. |
| 2020/0169967 A1 | 5/2020 | Yu et al. |
| 2020/0194928 A1 | 6/2020 | Yeo et al. |
| 2021/0234259 A1 | 7/2021 | Son |

FOREIGN PATENT DOCUMENTS

| | | |
|---|---|---|
| KR | 1020120062841 | 6/2012 |
| KR | 1020190023995 | 3/2019 |
| KR | 1020190131167 | 11/2019 |
| KR | 10-2020-0073478 | 6/2020 |
| KR | 1020200063022 | 6/2020 |

* cited by examiner

ELECTRONIC DEVICE AND METHOD FOR CONTROLLING A TRANSMISSION POWER OF A COMMUNICATION MODULE

CROSS-REFERENCE TO RELATED APPLICATION(S)

This application is a continuation of International Application No. PCT/KR2022/000928, filed on Jan. 18, 2022, which is based on and claims priority to Korean Patent Application No. 10-2021-0010342, filed on Jan. 25, 2021, in the Korean Intellectual Property Office, the entire disclosure of each of which is incorporated herein by reference.

BACKGROUND

1. Field

The disclosure relates generally to an electronic device and method capable of controlling transmission power of a communication module.

2. Description of Related Art

Different types of electronic devices, such as bar type electronic devices, foldable type electronic devices, rollable type electronic devices, wearable type electronic devices, or tablet personal computers (PCs) are increasing.

Electronic devices may transmit and receive phone calls and various data to and from other electronic devices through wireless communication.

Electronic devices may include at least one antenna to perform wireless communication with other electronic devices using a network.

In an electronic device, at least a portion of a housing forming an exterior may be composed of a conductive material (e.g., metal).

At least a part of the housing made of the conductive material may be used as an antenna (or antenna radiator) for performing wireless communication. For example, the housing of the electronic device may be separated through at least one segment (e.g., a slit) to be used as a plurality of antennas.

The electronic device, when transmitting a wireless signal using a plurality of antennas, may include a plurality of sensor modules (e.g., a grip sensor or a touch sensor) that support control of the transmission power according to a specific absorption rate (SAR). For example, when the electronic device supports various frequency bands using a plurality of antennas, the electronic device may include a plurality of sensor modules disposed at the lower end and upper end of the housing.

When the electronic device uses a plurality of sensor modules, the cost of the electronic device may increase, the space for mounting electronic components in the electronic device may decrease, and power consumption may increase.

SUMMARY

Various embodiments of the present disclosure may provide an electronic device and method capable of controlling the transmission power of a communication module using a signal connection member (e.g., a coaxial cable or a flexible printed circuit board (FPCB)) and one sensor module (e.g., a grip sensor or a touch sensor).

The technical problems to be achieved in the present disclosure are not limited to the technical problems mentioned above, and other technical problems not mentioned may be understood clearly by those of ordinary skill in the art from the description below.

According to an aspect of the present disclosure, an electronic device includes a housing; a first antenna for transmitting and receiving at least one of a first wireless transmission signal and a first wireless reception signal using the first portion of the housing; a first printed circuit board (PCB) electrically connected to the first antenna and including a first connector; a second PCB electrically connected to the first PCB and including a second connector; a signal connection member having a first end connected to the first connector and a second end connected to the second connector; a communication module electrically connected to the second connector and controlling the at least one of the first wireless transmission signal and the first wireless reception signal; a sensor module which is electrically connected to the second connector, and adjusts at least one sensing parameter based on frequency information of the at least one of the first wireless transmission signal and the first wireless reception signal, and measures capacitance for a path of the at least one of the first wireless transmission signal and the first wireless reception signal between the first antenna and the second connector; and a processor configured to control the transmission power of the communication module according to the capacitance measured by using the sensor module.

According to another aspect of the present disclosure, a method for controlling a transmission power of an electronic device is provided. The method includes monitoring, by a processor, a contact state of a first antenna; setting, by the processor, at least one of a filtering setting value and a sensing period of a sensor module based on information of a frequency band in which communication is made through the first antenna; determining, by the processor, whether a human body of a user of the electronic device is in contact with the first antenna; removing, by the processor, a noise signal from a sensing signal related to at least one of a first wireless reception signal or a unit time change value of capacitance received through the first antenna using at least one of a first filter or a second filter when the human body of the user of the electronic device is in contact with the first antenna; and controlling, by the processor, a communication module to control transmission power transmitted through the first antenna.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
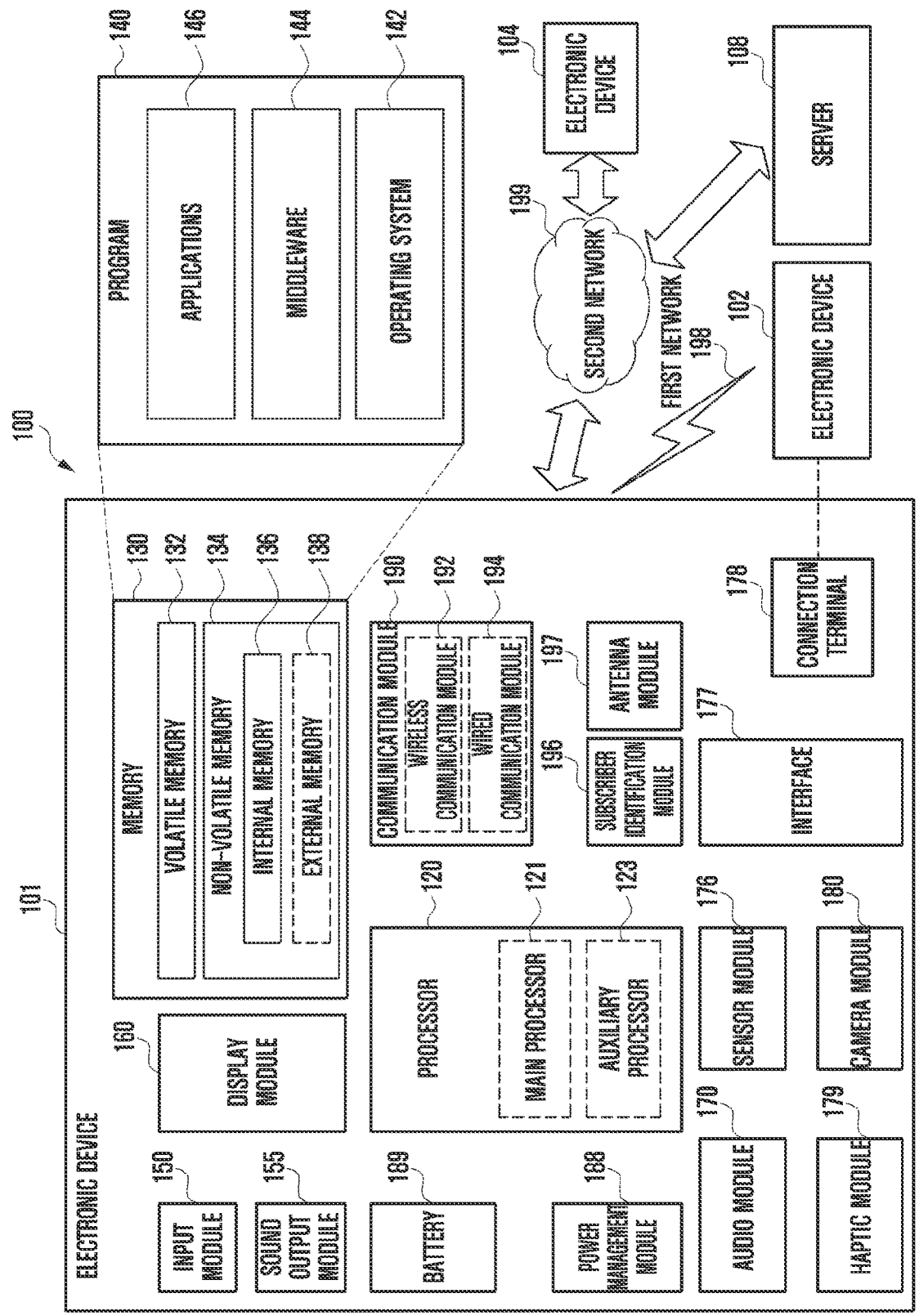
FIG. 1 illustrates an electronic device in a network environment, according to an embodiment.

An electronic device and method according to an embodiment electrically connect a first PCB and a second PCB through a signal connection member (e.g., a coaxial cable or FPCB) to obtain a wireless signal or transmit and receive sensing signals and use one sensor module (e.g., a grip sensor or a touch sensor) to reduce the cost of the electronic device, secure a mounting space for electronic components, and control the transmission power of the communication module.

In addition to this, various effects that are directly or indirectly identified through this document may be provided.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISP, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a PCB). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturers server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
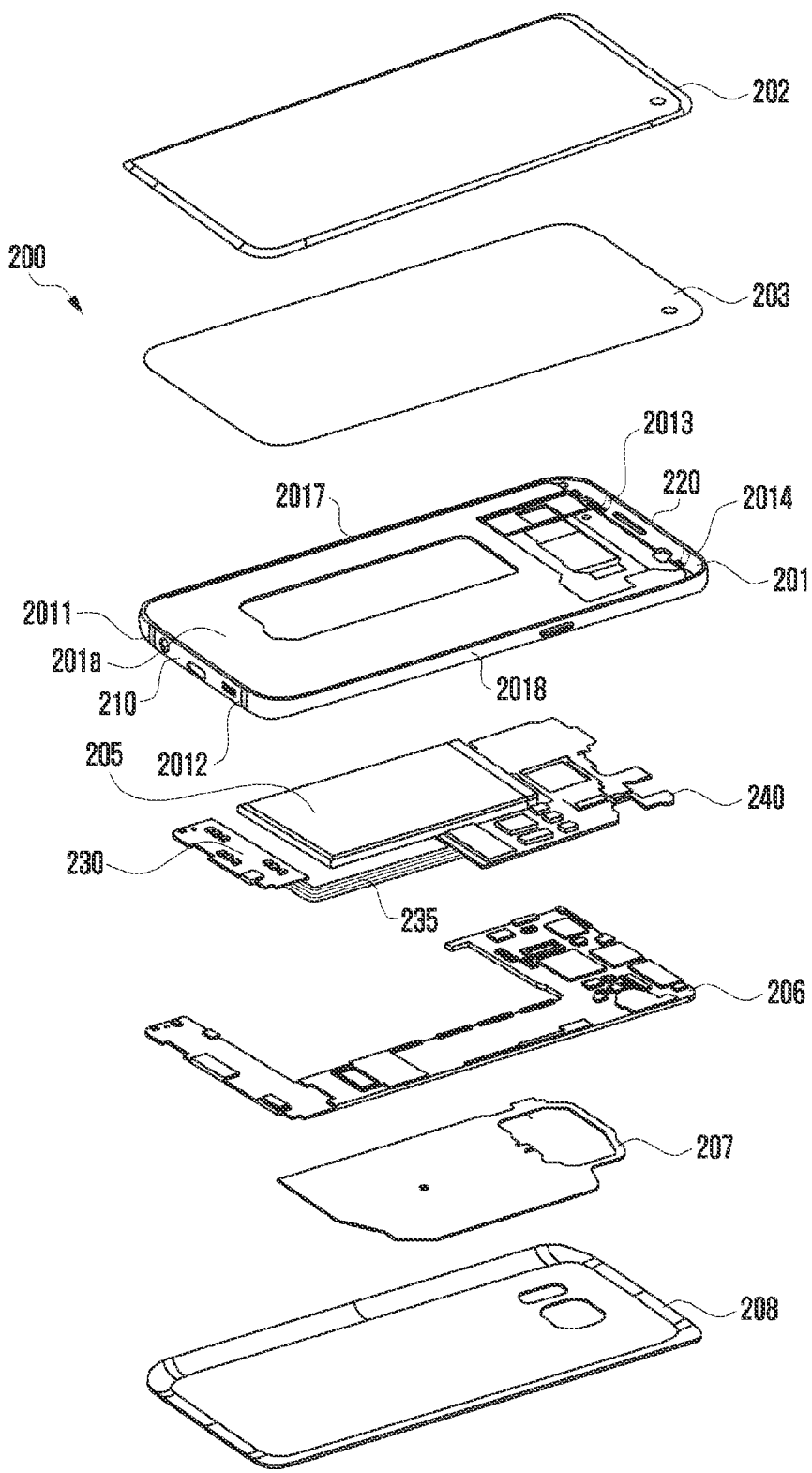
FIG. 2A is an exploded perspective view schematically showing an electronic device, according to an embodiment.
Figure 2B:
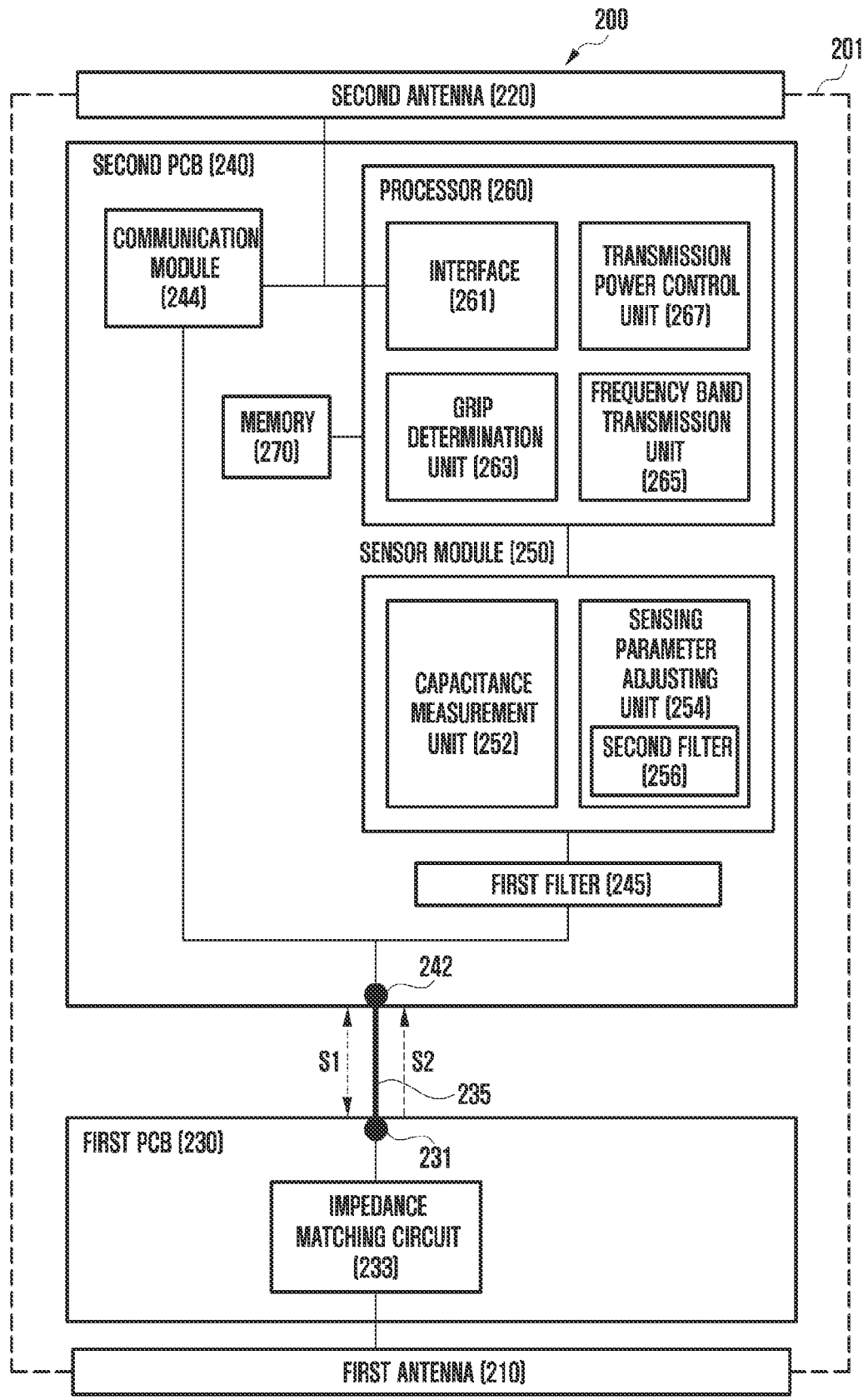
FIG. 2B illustrates an electronic device, according to an embodiment.
Figure 3:
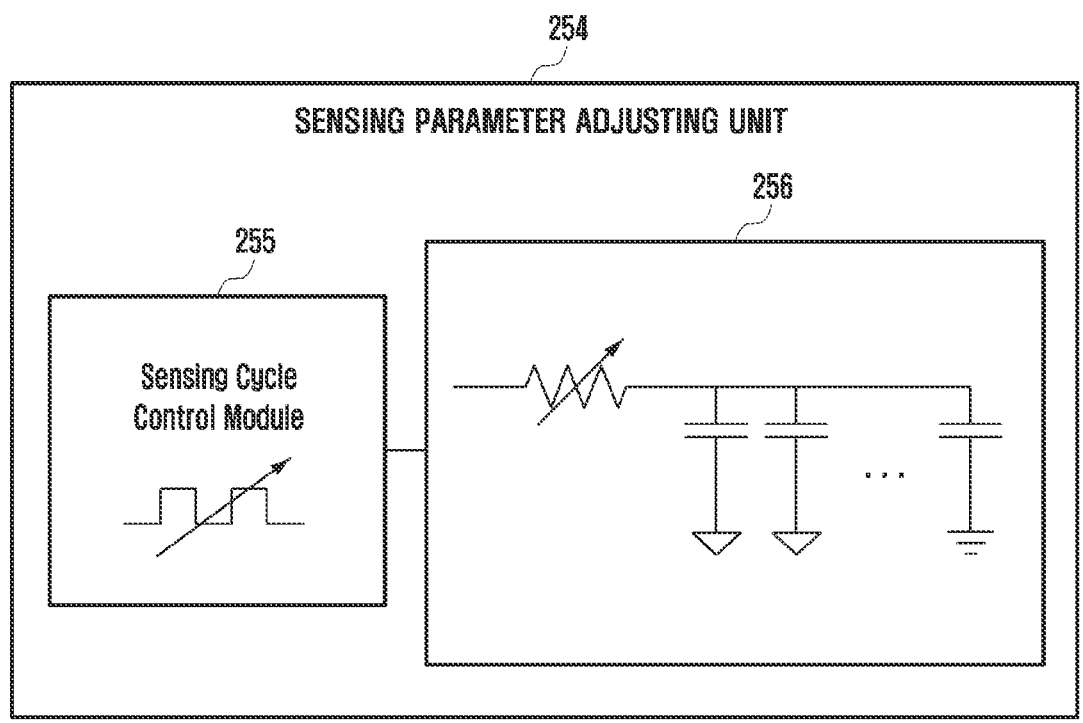
FIG. 3 illustrates a sensing parameter adjusting unit of the electronic device of FIG. 2, according to an embodiment.
Figure 4:
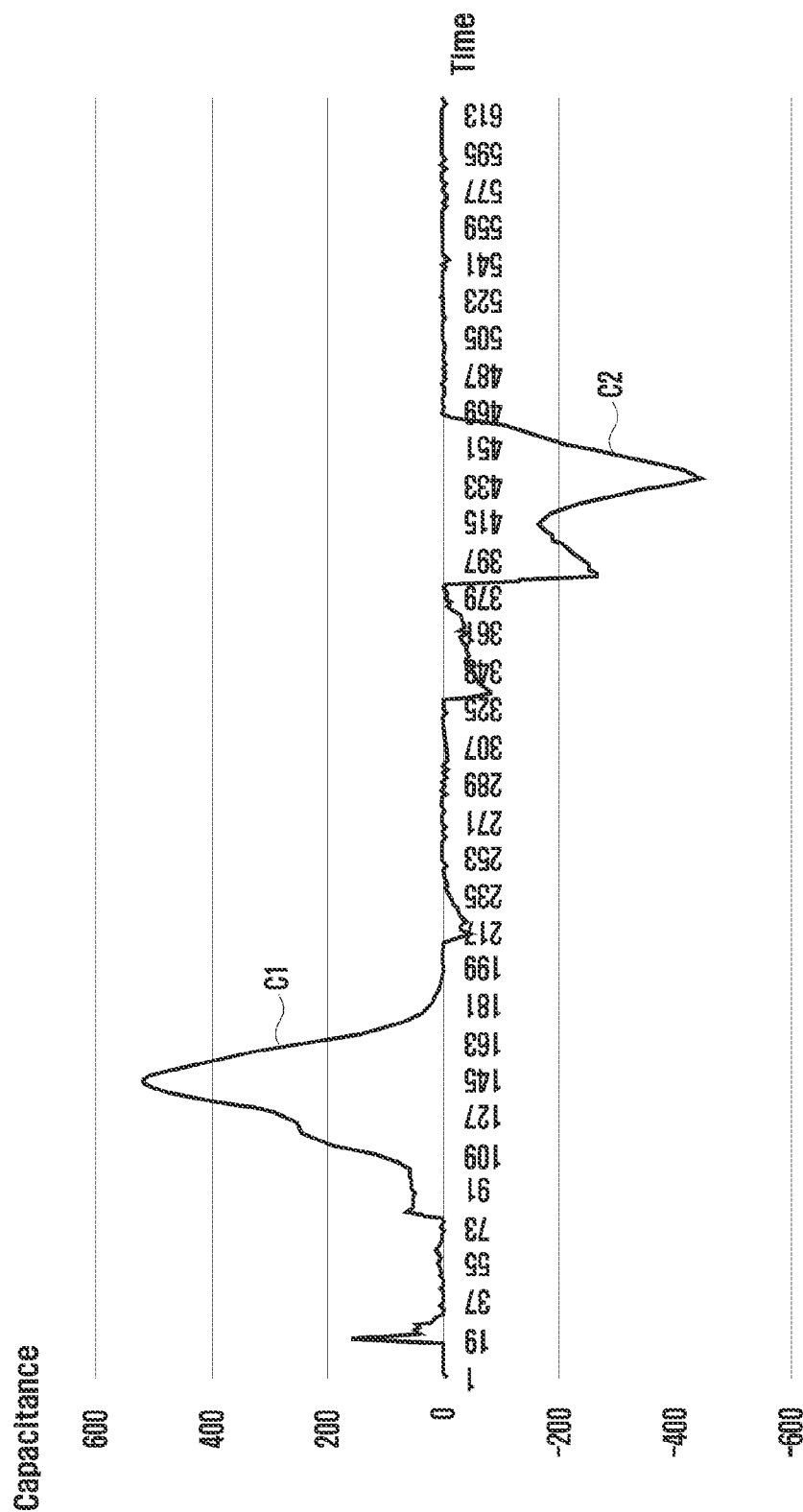
FIG. 4 illustrates a change in capacitance of the first antenna when a user touches the first antenna, according to an embodiment.
Figure 5:
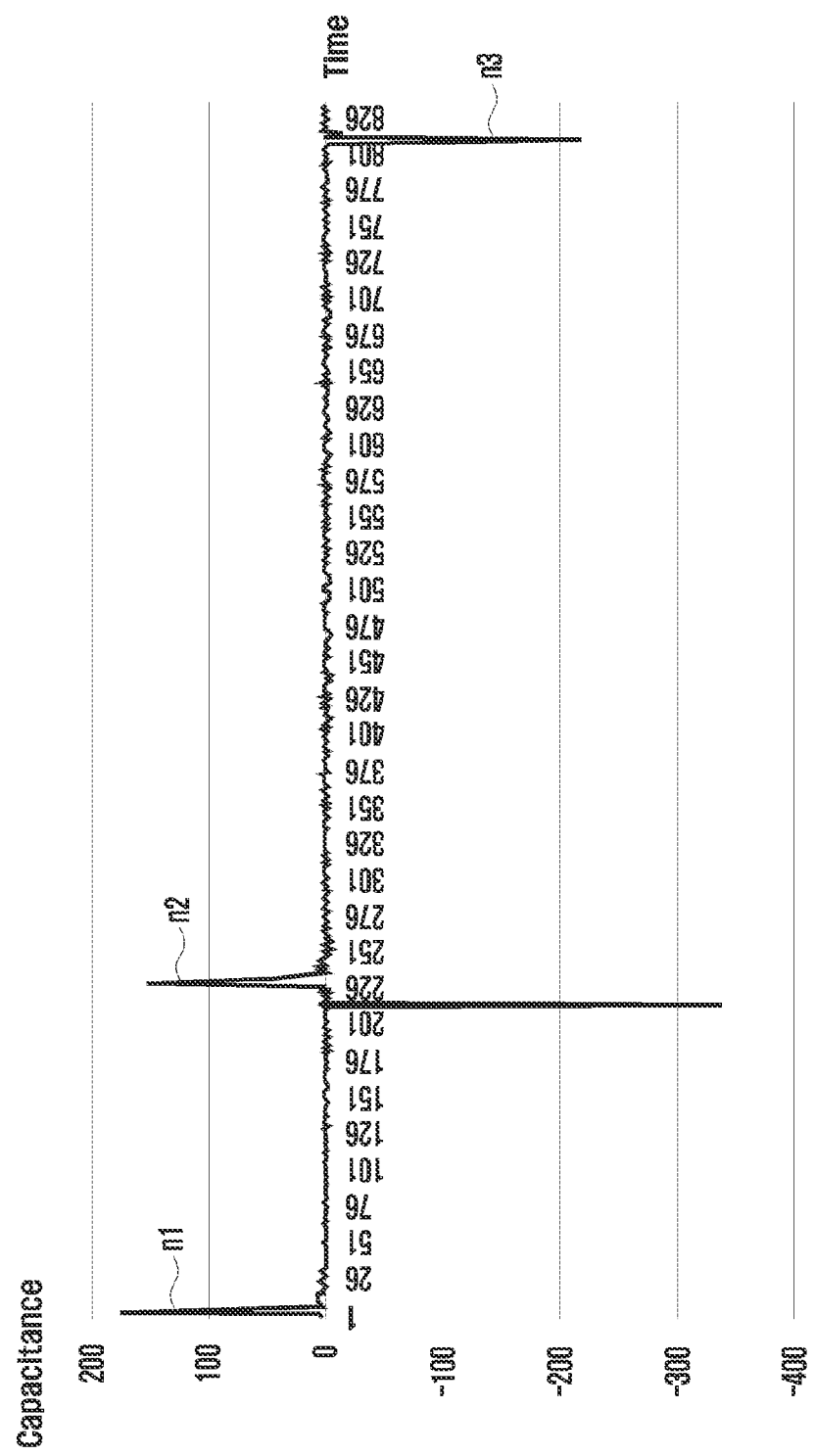
FIG. 5 illustrates a noise signal according to a change in capacitance of FIG. 4, according to an embodiment.
Figure 6:
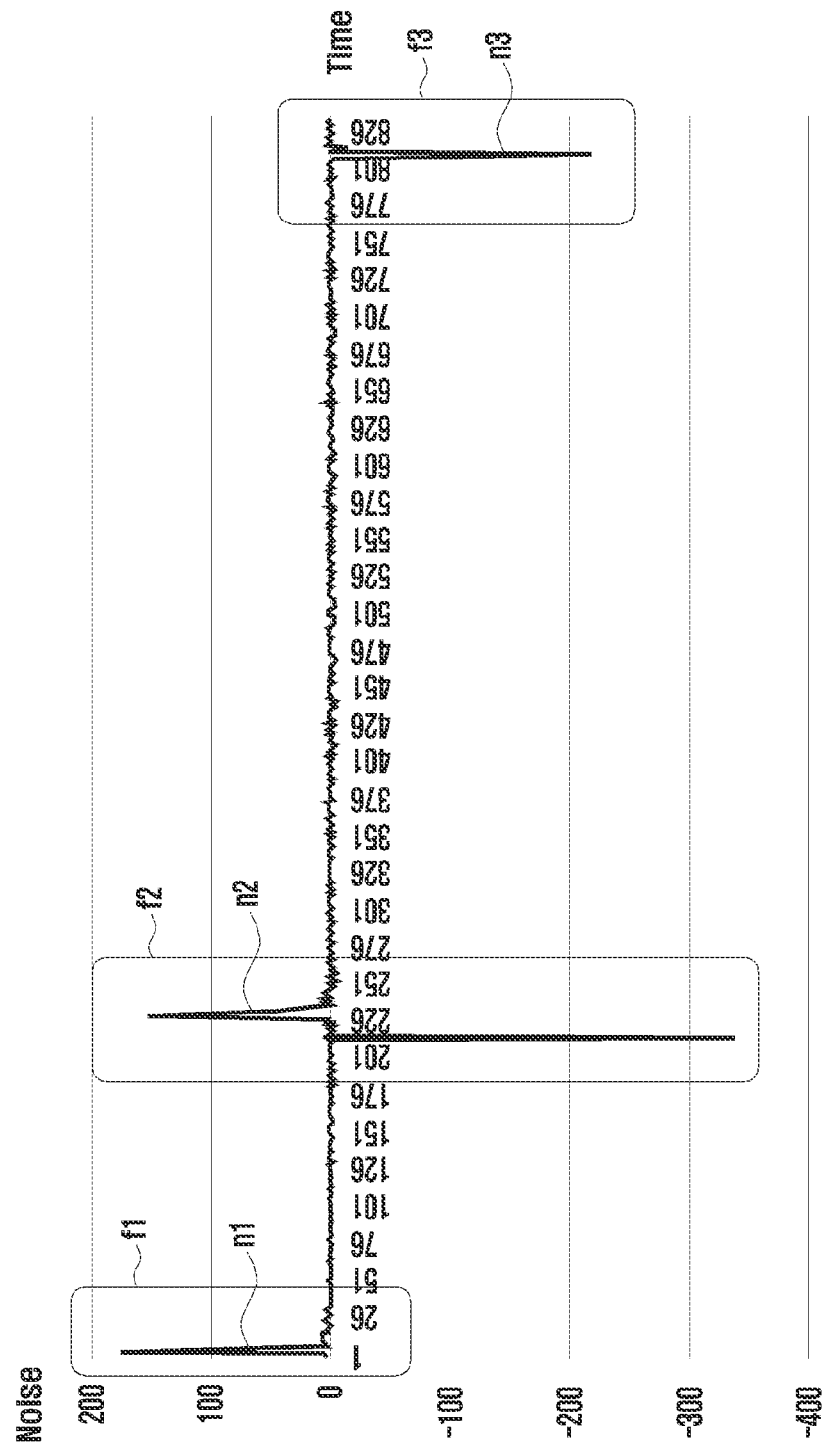
FIG. 6 illustrates filtering the noise signal of FIG. 5 using a second filter, according to an embodiment.
Figure 7:
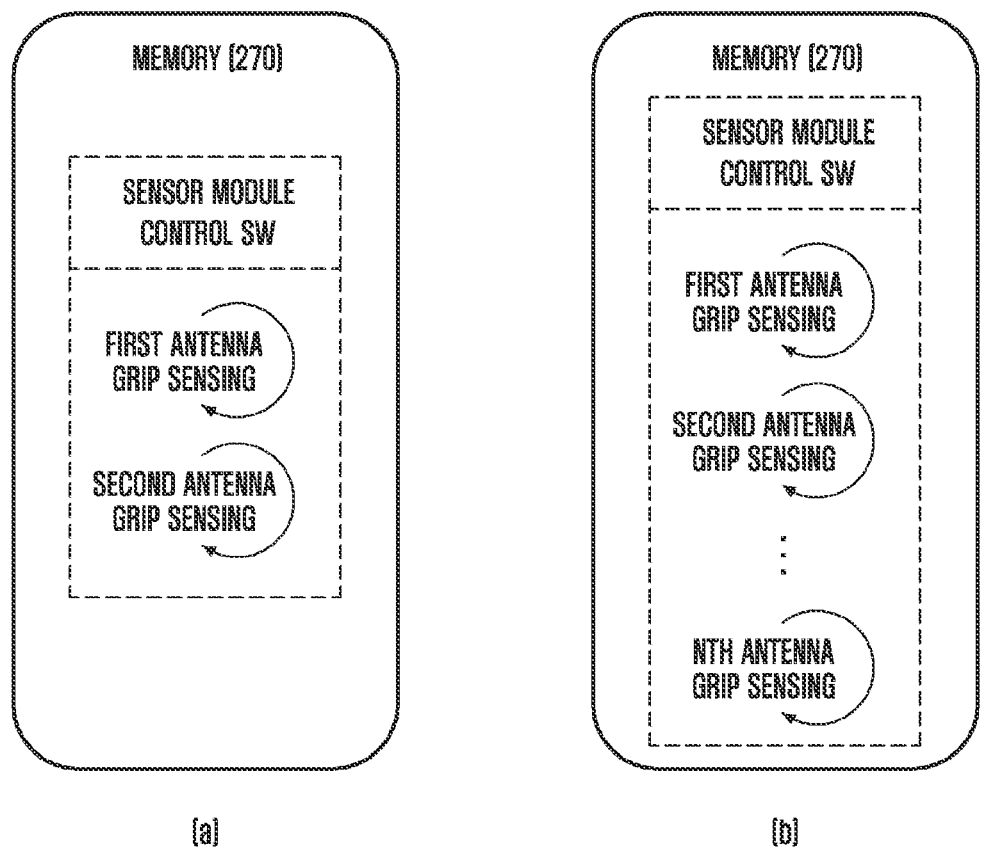
FIG. 7 illustrates a memory for storing a program for controlling a sensor module of an electronic device, according to an embodiment.

FIG. 2A is an exploded perspective view schematically illustrating an electronic device, according to an embodiment. FIG. 2B is a block diagram schematically illustrating a constitution of an electronic device, according to an embodiment. FIG. 3 is a diagram illustrating a constitution of a sensing parameter adjusting unit of the electronic device of FIG. 2, according to an embodiment. FIG. 4 is a diagram illustrating a change in capacitance of a first antenna when a user contacts with the first antenna, according to an embodiment. FIG. 5 is a diagram illustrating a noise signal according to a capacitance change of FIG. 4, according to an embodiment. FIG. 6 is a diagram illustrating an example of filtering the noise signal of FIG. 5 using a second filter, according to an embodiment. FIG. 7 is a diagram schematically illustrating a constitution of a memory in which an electronic device stores a program for controlling a sensor module, according to an embodiment.

The electronic device 200 of FIGS. 2A and 2B may include components and embodiments described through the electronic device 101 illustrated in FIG. 1.

The electronic device 200 according to various embodiments of the present disclosure may include a bar type electronic device, a foldable type electronic device, a rollable type electronic device, a sliding type electronic device, a wearable type electronic device, a tablet PC, or a notebook PC. The electronic device 200 according to various embodiments of the present disclosure is not limited to the above-described example, and may include various other electronic devices.

With reference to FIGS. 2A and 2B, an electronic device 200 includes a housing 201 (e.g., a side member or a side bezel structure), a first supporting member 201a (e.g., a bracket or supporting structure), a front plate 202 (e.g., a front cover), a display 203, a first PCB 230, a second PCB 240, a battery 205, a second support member 206 (e.g., a rear case), an antenna 207, and a rear plate 208 (e.g., a rear cover). In some embodiments, the electronic device 200 may omit at least one of the aforementioned components (e.g., the first support member 201a or the second support member 206) or additionally include other components. At least one of the components of the electronic device 200 may be the same as or similar to at least one of the components of the electronic device 101 illustrated in FIG. 1, and overlapping descriptions will be omitted below.

The first support member 201a may be disposed inside the electronic device 200 and connected to the housing 201, or may be integrally formed with the housing 201. The first support member 201a may be formed of, for example, a metallic material and/or a non-metallic (e.g., polymer) material. The first support member 201 may be coupled to a display 203 on one surface, and either or both the first PCB 230 or the second PCB 240 may be coupled to the other surface.

The first PCB 230 may include an impedance matching circuit 233.

The second PCB 240 may be equipped with a processor 260, a memory 270, or an interface 177. The processor 260 may include, for example, one or more of a central processing unit, an AP, a GPU, an ISP, a sensor hub processor, or a CP.

The second PCB 240 may be equipped with the communication module 244, the first filter 245, or the sensor module 250 shown in FIG. 2B.

The first PCB 230 may be implemented in the form of an FPCB. The second PCB 240 may be implemented in the form of a rigid PCB. The second PCB 240 may include a structure in which a plurality of PCBs are stacked. When a plurality of PCBs are stacked, each PCB may be electrically connected using an interposer.

The first PCB 230 and the second PCB 240 may be electrically connected using a signal connection member 235 (e.g., a coaxial cable or FPCB).

A memory 270 may include, for example, a volatile memory or a non-volatile memory.

The interface 177 may include, for example, an HDMI, a USB interface, an SD card interface, or an audio interface. The interface may, for example, electrically or physically connect the electronic device 300 to an external electronic device, and may include a USB connector, an SD card/multimedia card (MMC) connector, or an audio connector.

The battery 205 is a device for supplying power to at least one component of the electronic device 200, and may include, for example, a non-rechargeable primary battery, a rechargeable secondary battery, or a fuel cell. At least a portion of the battery 205 may be disposed substantially coplanar with either or both the first PCB 230 or the second PCB 240. The battery 205 may be integrally disposed inside the electronic device 200. In addition, the battery 205 may be detachably disposed from the electronic device 200.

The antenna 207 may be disposed between the back plate 208 and the battery 205. The antenna 207 may include a near field communication (NFC) antenna, a wireless charging antenna, or a magnetic secure transmission (MST) antenna. The antenna 207 may perform short-range communication with an external device or wirelessly transmit/receive power required for charging. In addition, an antenna structure may be formed by a part of the housing 201 or the first support member 201a or a combination thereof.

The housing 201 may form the exterior of the electronic device 200. At least a portion of the housing 201 may be formed of a conductive material (e.g., metal). The housing 201 may include a first part (e.g., a lower surface) physically separated by the first segmental part 2011 and the second segmental part 2012. The first part may be used as the first antenna 210. The housing 201 may include a second part (e.g., an upper surface) physically separated by the third segment part 2013 and the fourth segment part 2014. The second part may be used as the second antenna 220.

The housing 201 may use a third part (e.g., a first side) between the first segment part 2011 and the third segment part 2013 as the third antenna 2017. The housing 201 may use a fourth part (e.g., a second side surface) between the second segment part 2012 and the fourth segment part 2014 as the fourth antenna 2018.

The housing 201 of the electronic device 200 according to various embodiments of the present disclosure is not limited to the first antenna 210, the second antenna 220, the third antenna 2017, and the fourth antenna 2018, and may further include more n-th antennas according to the number of segments. With reference to FIGS. 2A and 2B, the electronic device 200 includes a housing 201, a first antenna 210, a second antenna 220, a first PCB 230, a signal connection member 235, and a second PCB 240 or any combination thereof.

The housing 201 may include a first PCB 230 and a second PCB 240.

The first antenna 210 may include an antenna radiator that at least a portion (e.g., a lower surface or a lower end) of the housing 201 is separated from by the first segment part 2011 and the second segment part 2012. For example, the first antenna 210 may be configured using a first portion (e.g., a lower surface) of the housing 201 separated by the first segmental part 2011 and the second segmental part 2012. The first antenna 210 may transmit a first radio frequency (RF) transmission signal (e.g., a first frequency band) to an external electronic device or may receive the first wireless reception signal from an external electronic device. A first wireless transmission signal transmitted to an external electronic device through the first antenna 210 may be a signal generated by the processor 260 and processed through the communication module 244. A first wireless reception signal received from an external electronic device through the first antenna 210 may be processed through the communication module 244 and analyzed by the processor 260.

The first antenna 210 may operate in a first frequency band (e.g., about 0.7 gigahertz (GHz) to 6 GHz). The first antenna 210 is not limited to the first frequency band, and may transmit and receive signals in other frequency bands.

The second antenna 220 may include an antenna radiator that is at least a portion (e.g., an upper surface or an upper end) of the housing 201 and is separated by a third segment part 2013 and a fourth segment part 2014. For example, the second antenna 220 may be configured using a second portion (e.g., an upper surface) of the housing 201 separated by the third segment part 2013 and the fourth segment part 2014. The second antenna 220 may transmit a second RF transmission signal (e.g., a second frequency band) to an external electronic device or may receive the first wireless reception signal from an external electronic device. A second wireless transmission signal transmitted to an external electronic device through the second antenna 220 may be a signal generated by the processor 260 and processed through the communication module 244. A second wireless reception signal received through the second antenna 220 from an external electronic device may be processed through the communication module 244 and analyzed by the processor 260.

The second antenna 220 may transmit and receive either or both a first wireless transmission signal or a second wireless reception signal having a frequency band different from that of the first antenna 210. For example, the second antenna 220 may operate in a second frequency band (e.g., about 1 GHz to 10 GHz). The second antenna 220 is not limited to the second frequency band, and may transmit and receive signals in other frequency bands.

The first PCB 230 may be electrically connected to the first antenna 210. For example, the first PCB 230 may be connected to the first antenna 210 using a connection element (e.g., a c-clip) to implement impedance matching and a short transmission length. The first PCB 230 may include a first connector 231 and an impedance matching circuit 233.

The first connector 231 may be connected to the first end of the signal connection member 235. The first connector 231 may be electrically connected to the first antenna 210 through an impedance matching circuit 233.

The impedance matching circuit 233 may be electrically connected to the first antenna 210 and the first connector 231. The impedance matching circuit 233 may provide power to the first antenna 210. The impedance matching circuit 233 may match the impedance between the communication module 244 disposed on the second PCB 240 and the first antenna 210. The impedance matching circuit 233 may include at least one of a resistor, a capacitor, and an inductor to match the impedance between the communication module 244 and the first antenna 210. The impedance matching circuit 233 may be electrically connected to a ground member to match the impedance between the communication module 244 and the first antenna 210.

The signal connection member 235 may electrically connect the first PCB 230 and the second PCB 240 to each other. The signal connection member 235 may form an electrical path between the first PCB 230 and the second PCB 240. A first end of the signal connecting member 235 may be electrically connected to the first connector 231 disposed on the first PCB 230, and a second end may be electrically connected to the connector 242 disposed on the second PCB 240. The signal connection member 235 may include a coaxial cable or an FPCB. The first PCB 230 and the second PCB 240 may be electrically connected through a coaxial cable or an FPCB.

The signal connection member 235 may transmit the first wireless transmission signal transmitted through either or both the first antenna 210 or the impedance matching circuit 233 to the communication module 244 disposed on the second PCB 240, and may form a first signal path S1 that provides a signal processed by the communication module 244 to the first antenna 210.

When the first antenna 210 makes contact with (e.g., a grip or touch) the body of the user of the electronic device 200, the signal connection member 235 may form a second signal path S2 that provides a sensing signal related to an amount of change in capacitance of the first antenna 210 (e.g., a change in capacitance per unit time) to the sensor module 250 disposed on the second PCB 240.

The second PCB 240 may include a second connector 242, a communication module 244, a first filter 245, a sensor module 250, a processor 260, or a memory 270 or any combination thereof. The second PCB 240 may include a rigid PCB.

The second connector 242 may be connected to the second end of the signal connection member 235. The second connector 242 may provide a branching point for the communication module 244 and the first filter 245 (or the sensor module 250).

The second connector 242 may transmit the signal processed by the communication module 244 through the first signal path S1 of the signal connection member 235 to the first connector 231 and the first antenna 210. The second connector 242 may transmit either or both the first wireless transmission signal or the first wireless reception signal of the first antenna 210 transmitted through the signal connection member 235 to the communication module 244 by the first signal path S1. When the first antenna 210 contacts the human body of the user of the electronic device 200, the amount of change in capacitance of the first antenna 210 according to the contact (e.g., a sensing signal related to a unit time change value of capacitance) is transmitted through the second signal path S2 of the signal connection member 235, and the received sensing signal may be provided to either or both the first filter 245 or the sensor module 250.

The communication module 244 may be electrically connected to the second connector 242. The communication module 244 may be configured to respectively transmit and receive a first wireless transmission signal and a first wireless reception signal of the first antenna 210 and a second wireless transmission signal and a second wireless reception signal of the second antenna 220. The communication module 244 may supply current to the second connector 242 and the first connector 231 using the signal connection member 235.

The communication module 244 may include the communication module 190 of FIG. 1. The communication module 244 is able to support establishment of a direct (e.g., wired) communication channel or a wireless communication channel and perform communication through the established communication channel between the electronic device 200 and an external electronic device.

The communication module 244 may be controlled by a CP included in the processor 260. The communication module 244 may receive a control signal from the processor 260 and control transmission power transmitted through the first antenna 210 and the second antenna 220. The communication module 244 may receive a control signal from the processor 260 and control the strength of a signal transmitted through the first antenna 210 and the second antenna 220.

The transmission power transmitted through the first antenna 210 and the second antenna 220 may be an electromagnetic wave absorption rate (an SAR) that may adversely affect the human body of the user of the electronic device 200. When the user touches the electronic device 200, the communication module 244 may control the transmission power under the control of the processor 260 to lower an SAR. The communication module 244, in the process of communicating with an external electronic device, even when the user of the electronic device 200 contacts the first antenna 210 of the housing 201 adjacently, may control the transmission power.

The first filter 245 may be electrically connected to the second connector 242. The first filter 245 is able to filter the noise of the sensing signal related to a first radio transmission signal, the first radio reception signal, and the amount of change in capacitance (e.g., change in capacitance per unit time) of the first antenna 210 transmitted through the first signal path S1 or the second signal path S2 of the signal connection member 235. The first filter 245 may prevent a noise signal transmitted from the first antenna 210 through the signal connection member 235 from being transmitted to the sensor module 250.

The first filter 245 may include a band pass filter or a low pass filter. The first filter 245 may include a resistor-inductor (RL) circuit or a resistor-capacitor (RC) circuit.

The sensor module 250 may be electrically connected to the first filter 245. The sensor module 250 may be electrically connected to the second connector 242 through the first filter 245. The sensor module 250 may support a plurality of channels. The sensor module 250 may be configured to measure a unit time change value (or change amount) of capacitance. The sensor module 250 may transmit a measured sensing value (e.g., a change value or amount of change in capacitance per unit time) to the processor 260.

The sensor module 250 may include either or both a capacitance measuring unit 252 or a sensing parameter adjusting unit 254.

The capacitance measuring unit 252 may measure a capacitance change amount for a path (e.g., a unit time change value of capacitance) between the first antenna 210 and the second connector 242 transmitted through the second signal path S2 of the signal connection member 235, and may transmit a signal related to the measured capacitance to the processor 260. When the first antenna 210 contacts (e.g., a grip or touch) a human body (e.g., hand) of the user of the electronic device 200, or in the process of the electronic device 200 communicating with an external electronic device by the first antenna 210, when the user of the electronic device 200 contacts the first antenna 210 of the housing 201 adjacently, the capacitance measuring unit 252 may determine whether the unit time change value (or change amount) of capacitance is greater than or equal to a specified set value.

The sensing parameter adjusting unit 254 may receive the control information related to either or both the first wireless transmission signal or the first wireless reception signal of the first antenna 210 through the processor 260. The sensing parameter adjusting unit 254 may adjust at least one sensing parameter (e.g., a filtering setting value, a sensing period, or a sensing frequency) based on control information related to the first wireless transmission signal and the first wireless reception signal received from the processor 260.

The sensor module 250 may include the sensor module 176 of FIG. 1. The sensor module 250 may include a grip sensor or a touch sensor that measures a capacitance value or measures a capacitance change amount (e.g., a capacitance change value per unit time). When the user of the electronic device 200 contacts (e.g., grips or touches) the first antenna 210 during a time that a first wireless transmission signal of the first antenna 210 or a second wireless transmission signal of the second antenna 220 is transmitted to the outside of the electronic device 200, the sensor module 250 may determine a transmission power to meet a requirement related to an SAR and transmit the determined value to the processor 260.

With reference to FIG. 3, the sensing parameter adjusting unit 254 may include either or both a sensing cycle control module 255 or a second filter 256.

The sensing cycle control module 255, based on the frequency band information transmitted in real time through the processor 260, may vary a sensing period or a sensing frequency for recognizing the contact (grip or touch) of the first antenna 210 to correspond to the frequency band information. The sensing cycle control module 255 may avoid a noise signal induced through a specific frequency band (e.g., about 0.7 GHz to 6 GHz). The sensing cycle control module 255 may be configured to avoid the noise signal associated with the time domain related to the first wireless transmission signal of the first antenna 210 or the capacitance change amount (e.g., the unit time change value of the capacitance) through the first signal path S1.

The second filter 256 may filter the noise signal that is not removed through the first filter 245. The second filter 256 may adjust the filtering setting value based on the frequency band information transmitted in real time through the processor 260. The second filter 256 may use dynamic or variable control of software stored in the memory 270 to filter out noise signals that are not removed by the first filter 245. The sensing parameter adjusting unit 254 may include a plurality of hardware filters. The sensing parameter adjusting unit 254 may select or switch one of a plurality of hardware filters to correspond to the frequency band information of the first antenna 210.

The second filter 256 may include a band pass filter or a low pass filter. The second filter 256 may include an RL circuit or an RC circuit. The second filter 256 may control the RC circuit to set a cutoff frequency. The RC value of the second filter 256 may be adjusted according to the control of the processor 260.

The sensor module 250 may receive frequency band information having a noise component from the processor 260 in real time. Based on the frequency band information with the noise component transmitted in real time from the processor 260 through the sensing parameter adjusting unit 254, the sensor module 250 may remove a noise signal not removed through the first filter 245 through the second filter 256 by adjusting at least one sensing parameter (e.g. a filtering setpoint, a sensing period, or a sensing frequency).

Signals including a ripple in the frequency band information having a noise component may generate a ghost grip. The sensor module 250, varying the sensing frequency or the sensing period by using the sensing parameter adjuster 254 or the second filter 256 according to frequency band information having a noise component transmitted in real time from the processor 260, may remove noise related to the ripple signal.

Referring to FIG. 4, when the user of the electronic device 200 contacts (e.g., grips or touches) the first antenna 210, a unit time change value of the capacitance of the first antenna 210 may be changed (e.g., C1, C2). The unit time change value of the capacitance may be changed over a period of, for example, several tens to several hundreds of milliseconds (msec).

Referring to FIG. 5, when the user of the electronic device 200 contacts (e.g., grips or touches) the first antenna 210, the noise signal (e.g., n1, n2, and/or n3) included in the first wireless transmission signal of the first antenna 210 may represent a unit time change value (or amount of change) of capacitance for a time of several tens of nanoseconds (nsec).

Referring to FIG. 6, for example, the noise signal (e.g., n1, n2, and/or n3) of FIG. 5 may be filtered (e.g., f1, f2, and/or f3) using the second filter 256. For example, the processor 260 of the electronic device 200, using a window function of about 20 msec, may remove the generated grip signal by the second filter 256 due to a unit time change value (or amount of change) of the capacitance that appears without the presence of a continuous value within about 20 msec and this change.

The processor 260 may be set to control the transmission power for the communication module 244 according to a signal measured using the sensor module 250. The processor 260 may be electrically or operatively connected to the first antenna 210, the second antenna 220, the communication module 244, the sensor module 250 or the memory 270. The processor 260 may control at least one sensing parameter (e.g., a filtering setting value, a sensing period, or a sensing frequency) of the sensor module 250.

The processor 260 may control the overall operation of the electronic device 200 and the signal flow between internal components of the electronic device 200, and may perform a data processing function for processing data. For example, the processor 260 may include a CPU, an AP and a CP. The processor 260 may be configured as a single core processor or a multi-core processor. The processor 560 may include at least one or more processors. The processor 260 may include the processor 260 of FIG. 1.

The processor 260 may include an interface 261, a grip determination unit 263, a frequency band transfer unit 265, and a transmission power control unit 267.

The interface 261 may support at least one specified protocol capable of being used for the electronic device 200 to be directly or wirelessly connected to an external electronic device. The interface 261 may be electrically connected to the communication module 244.

The grip determination unit 263 transmits a unit time change value of capacitance or a unit time change amount of capacitance for a path through the sensor module 250 between the first antenna 210 and the second connector 242 transmitted through the second signal path S2 of the signal connection member 235. Also, based on the unit time change value (or change amount) of the received capacitance, the grip determination unit may determine whether the first antenna 210 has been touched (gripped or touched) by the user.

The frequency band transfer unit 265 may transmit frequency band information having a noise component to the sensor module 250 in real time. The frequency band transfer unit 265, for example, may analyze the frequency band information of a network communicating through the first antenna 210 or the second antenna, and may transmit the analyzed information to the sensor module 250 in real time.

The transmit power control unit 267 may control the communication module 244 to control the power transmitted through either or both the first antenna 210 or the second antenna 220. When the first wireless transmission signal of the first antenna 210 or the second wireless transmission signal of the second antenna 220 is transmitted to the outside of the electronic device 200, the transmission power control unit 267 may determine a transmission power for meeting a requirement related to the electromagnetic wave absorption rate (e.g., an SAR), and may transmit the determined value to the communication module 244.

The memory 270 may store a lookup table related to at least one sensing parameter of the sensor module 250, and at least one of a filtering setting value, a sensing period, or a sensing frequency of the sensor module 250.

The memory 270 may perform a function of storing a program for processing and control of the processor 260, an OS, various applications, and input/output data; and may store a program for controlling the overall operation of the electronic device 200. The memory 270 may store a user interface (UI) provided by the electronic device 200 and various setting information necessary for function processing in the electronic device 200. The memory 270 may store and read instructions for operations performed by the processor 260.

Referring to (a) of FIG. 7, the memory 270 may store sensor module control SW (software) for controlling the sensor module 250 through the processor 260. The memory 270, using the stored sensor module 250 control software, may support the sensor module 250 in sensing the grip (e.g., contact or touch) state of the first antenna 210 and the grip state (e.g., contact or touch) of the second antenna 220. The memory 270 may include one (e.g., an individual) piece of software that controls the sensor module 250. The memory 270 may simultaneously sense a grip (e.g., contact or touch) state of the first antenna 210 and a grip (e.g., contact or touch) state of the second antenna 220 using one piece of software. The memory 270 may support to control at least one sensing parameter (e.g., a filtering setting value, a sensing period, or a sensing frequency) of the sensor module 250 through the processor 260.

Referring to (b) of FIG. 7, the memory 270, using the stored sensor module 250 control SW, may support the sensor module 250 to sense the grip state of the first antenna 210, the grip state of the second antenna 220, and the grip state of the n-th antenna (e.g., the third antenna 2017 and the fourth antenna 2018 of FIG. 2A). The housing 201 may include a plurality of other antennas (e.g., an nth antenna, such as the third antenna 2017 and the fourth antenna 2018 shown in FIG. 2A) in addition to the first antenna 210 and the second antenna 220. The plurality of antennas (the nth antenna) may be determined according to the number of segments part (e.g., slits) formed in the housing 201. The plurality of antennas may include mmWave array antennas, FPCB antennas, laser direct structuring (LDS) antennas, PCB embedded antennas (PEAs) and chip antennas. In addition, the memory 270, using one (e.g., an individual) piece of a sensor module 250 to control software, may be configured to simultaneously sense the grip status of the first antenna 210, the second antenna 220, and the n-th antenna (mmWave array antennas, FPCB antennas, PEAs or chip antennas).

Figure 8:
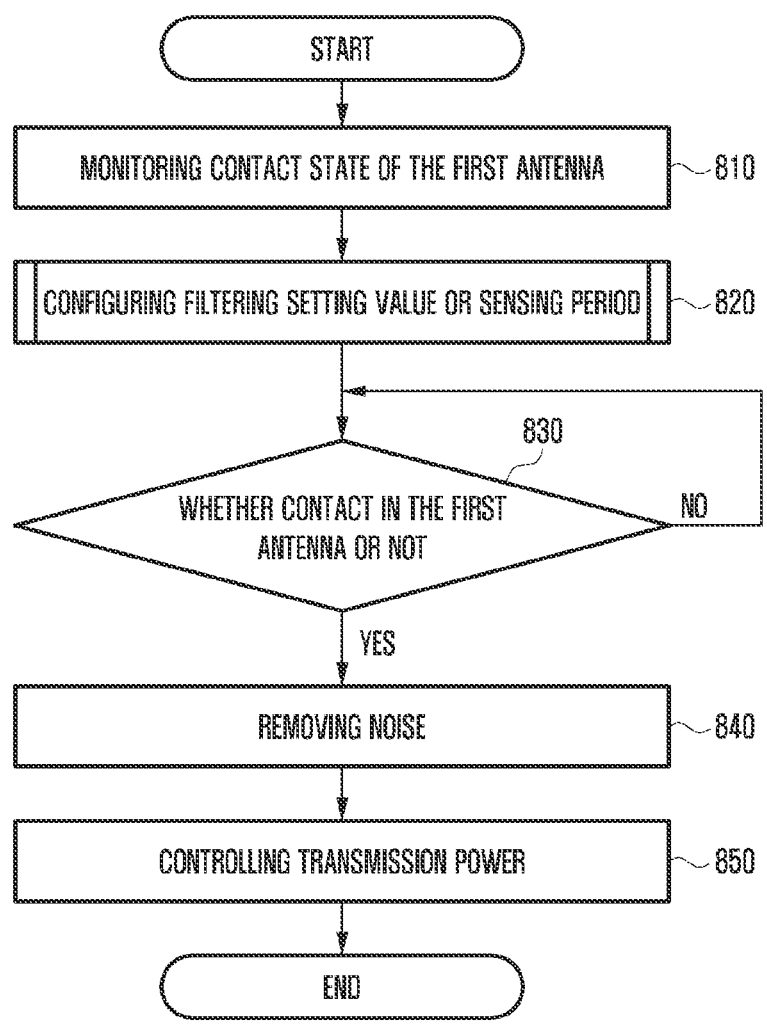
FIG. 8 is a flowchart illustrating a method of controlling transmission power of a communication module of an electronic device, according to an embodiment.
Figure 9:
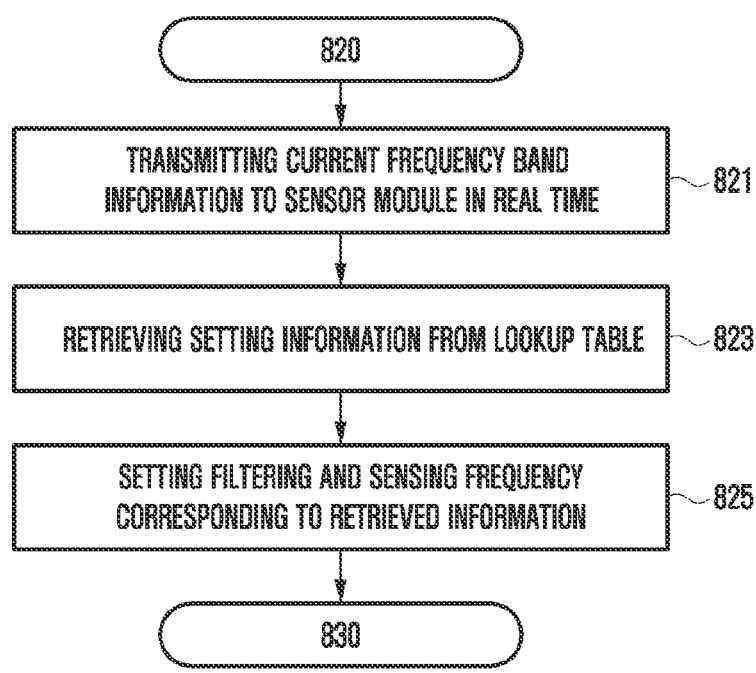
FIG. 9 illustrates a subroutine of step 820 disclosed in FIG. 8, according to an embodiment.

FIG. 8 is a flowchart illustrating a method of controlling transmission power of a communication module of an electronic device, according to an embodiment. FIG. 9 illustrates a subroutine of step 820 disclosed in FIG. 8, according to an embodiment.

Operations described with reference to FIGS. 8 and 9 may be executed by, for example, components described in the electronic device 101 of FIG. 1 or the electronic device 200 of FIG. 2. The embodiments related to the operations disclosed in FIGS. 8 and 9 may include the embodiments disclosed in FIGS. 1 to 7 described above. The embodiments described in FIGS. 8 and 9 may include, for example, communication activation, a communication standby mode, and a communication state for the first antenna 210 of the electronic device 200.

The electronic device 200 according to various embodiments of the present disclosure electrically connects the first PCB 230 and the second PCB 240 through the signal connection member 235 to transmit and receive a wireless signal or a sensing signal, and the electronic device 200 may control the transmission power of the communication module 244 by using one sensor module 250 (e.g., a grip sensor or a touch sensor).

In step 810, the processor 260 monitors the contact state of the first antenna 210.

When the first antenna 210 comes into contact with the body of a user of the electronic device 200, the processor 260 may receive a sensing signal related to the unit time change value (or change amount) of the capacitance of the first antenna 210 according to the contact through the sensor module 250 disposed on the second PCB 240.

In step 820, the processor 260 configures a filtering setting value or a sensing period of the sensor module 250 (e.g., the second filter 256) based on the frequency band information in which the communication is made through the first antenna 210.

The second filter 256 may adjust the filtering setting value or the sensing period (or sensing frequency) based on the frequency band information transmitted in real time through the processor 260.

In step 830, the processor 260 determines whether a body part of the user of the electronic device 200 has been in contact with the first antenna 210.

The processor 260 may use the grip determination unit 263 to transmit the capacitance change value (e.g., the unit time change value or amount of change of capacitance) for the path between first antenna 210 and the second connectors 242 through the second signal path S2 of the signal connection member 235 by the sensor module 250. Also, based on the received capacitance change value (or change amount) per unit time, the processor 260 may determine whether the first antenna 210 is touched (gripped or touched) by the user.

In step 840, if the first antenna 210 is touched (grip or touch) by the user of the electronic device 200, the first filter 245 or the second filter 256 is used to remove a noise signal from a sensing signal related to a first wireless reception signal received through the first antenna 210 or a unit time change value (or amount of change) of capacitance.

In step 850, the processor 260 controls the communication module 244 to control a transmission power of a signal that is transmitted through the first antenna 210.

The processor 260, using the transmission power control unit 267 to transmit the first wireless transmission signal of the first antenna 210 or the second wireless transmission of the second antenna 220 when a signal is transmitted to the outside of the electronic device 200, may determine a transmission power for meeting a requirement related to an SAR, and may transmit the determined value to the communication module 244.

The filtering configuration value and the sensing period (or sensing frequency) of the second filter 256 in step 820, described above, may be performed using the operations disclosed in FIG. 9.

In step 821, the processor 260 transmits frequency band information in which a communication is made through the first antenna 210 or the second antenna 220 to the sensor module 250 in real time.

In step 823, the processor 260 retrieves setting information from a lookup table. For example, the processor 260 may search for configuration information related to at least one sensing parameter (e.g., a filtering setting value, a sensing period, or a sensing frequency) of the sensor module 250 from the memory 270 (e.g., a lookup table).

In step 825, the processor 260 sets a filtering configuration value and a sensing period (or sensing frequency) corresponding to the information retrieved from the memory 270 to the second filter 256.

The electronic device 200 may include a housing 201, a first antenna 210 for transmitting and receiving either or both a first wireless transmission signal or a first wireless reception signal using the first portion of the housing, a first PCB 230 electrically connected to the first antenna and including a first connector 231, a second PCB 240 electrically connected to the first PCB and including a second connector 242, a signal connection member 235 having a first end connected to the first connector and a second end connected to the second connector, a communication module 244 electrically connected to the second connector and controlling either or both the first wireless transmission signal or the first wireless reception signal, a sensor module 250 which is electrically connected to the second connector and adjusts at least one sensing parameter based on frequency information of either or both the first wireless transmission signal or the first wireless reception signal and measures the capacitance for the path of either or both the first wireless transmission signal or the first wireless reception signal between the first antenna and the second connector, and a processor 260 configured to control the transmission power of the communication module according to the capacitance measured using the sensor module.

An impedance matching circuit 233 for matching impedance between the first antenna and the communication module may be included between the first antenna and the first connector.

The signal connection member 235 may include a coaxial cable or an FPCB.

The signal connection member 235 may be configured to form a first signal path S1 that transmits either or both a first wireless transmission signal or a first wireless reception signal transmitted through the first antenna to the communication module and provides a processed signal in the communication module to the first antenna.

When the first antenna comes into contact with the human body of the user of the electronic device, the signal connection member 235 may be configured to form a second signal path S2 that provides a sensing signal related to a change in capacitance corresponding to the contact per unit time to the sensor module.

Between the second connector 242 and the sensor module 250, a first filter 245 for filtering the noise signal transmitted from the first antenna to the sensor module may be included.

The sensor module 250 measures a change value of the capacitance in a unit time with respect to a path between the first antenna and the second connector transmitted through the signal connection member 235. Also, the sensor module 250 may include a capacitance measuring unit 252 for transferring the measured capacitance change per unit time to the processor and a sensing parameter adjusting unit 254 configured to adjust the at least one sensing parameter based on either or both the unit time change value of the measured capacitance or the first wireless transmission signal transmitted through the signal connection member.

The sensing parameter adjusting unit 254 may include a sensing cycle control module 255 that varies a sensing period or sensing frequency for recognizing the contact of the first antenna to correspond to frequency band information based on the frequency band information transmitted in real time through the processor.

The sensing parameter adjusting unit 254 may filter the noise signal that is not removed through the first filter, and may include a second filter 256 that adjusts a filtering setting value based on the frequency band information transmitted in real time through the processor.

The sensor module 250 may include a grip sensor or a touch sensor.

The processor 260 may transmit a unit time change value of capacitance for a path between the first antenna and the second connector transmitted through the signal connection member through the sensor module. Also the processor 260 may include a grip determination unit 263 that determines whether or not the first antenna has been touched by a user of the electronic device based on a unit time change value of the received capacitance, a frequency band transmitting unit 265 that transmits frequency band information including a noise component to the sensor module in real time, and a transmit power control unit 267 configured to control the communication module to control power transmitted through the first antenna.

The electronic device 200 may further include a memory 270 that stores a lookup table related to at least one sensing parameter of the sensor module 250.

The memory 270 may store software for controlling the sensor module through the processor to sense the grip state of the first antenna.

A method of controlling the transmission power of the electronic devices 101 and 200 may include the processor 260 monitoring the contact state of the first antenna 210; the processor 260 setting either or both a filtering setting value or a sensing period of the sensor module 250 based on the frequency band information in which communication is made through the first antenna 210; the processor 260 determining whether the human body of the user of the electronic device is in contact with the first antenna 210, when the human body of the user of the electronic device is in contact with the first antenna 210; the processor 260 removing the noise signal from the sensing signal related to the first wireless reception signal or the unit time change value of the capacitance received through the first antenna using either or both the first filter 245 or the second filter 256; and the processor 260 controlling the communication module 244 to control transmission power transmitted through the first antenna.

Setting a filtering set value or a sensing period of the sensor module 250 may include transmitting the frequency band information in which the processor 260 communicates through the first antenna to the sensor module in real time, the processor 260 searching the memory 270 for setting information related to at least one sensing parameter of the sensor module, and the processor 260 setting either or both the filtering set value or the sensing period corresponding to the information retrieved from the memory to the second filter 256.

The sensor module 250, based on the frequency band information transmitted in real time through the processor 260, may include a sensing parameter adjusting unit 254 that varies either or both the sensing frequency or the sensing period for recognizing the contact of the first antenna to correspond to the frequency band information.

The second filter 256 may filter the noise signal that is not removed through the first filter 245, and may be set to adjust either or both the filtering set value or the sensing period based on the frequency band information transmitted in real time through the processor 260.

The processor 260 may include a grip determination unit 263 that receives the unit time change value of the capacitance of the first antenna 210 through the sensor module 250 and determines whether the first antenna has been touched by a user of the electronic device based on the received unit time change value of the capacitance, a frequency band transmitting unit 265 that transmits the frequency band information including the noise signal to the sensor module in real time, and a transmit power control unit 267 configured to control the communication module 244 to control power transmitted through the first antenna 210.

The memory 270 may store a lookup table related to the at least one sensing parameter of the sensor module 250.

The memory 270 may be configured to store software for controlling the sensor module 250 through the processor 260 to sense the grip state of the first antenna 210.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
   a housing;
   a first antenna for transmitting and receiving at least one of a first wireless transmission signal and a first wireless reception signal using a first portion of the housing;
   a first printed circuit board (PCB) electrically connected to the first antenna and including a first connector;
   a second PCB electrically connected to the first PCB and including a second connector;
   a signal connection member having a first end connected to the first connector and a second end connected to the second connector;
   a communication module electrically connected to the second connector and controlling the at least one of the first wireless transmission signal and the first wireless reception signal;
   a sensor module which is electrically connected to the second connector, and adjusts at least one sensing parameter based on frequency information of the at least one of the first wireless transmission signal and the first wireless reception signal, and measures capacitance for a path of the at least one of the first wireless transmission signal and the first wireless reception signal between the first antenna and the second connector; and
   a processor configured to control the transmission power of the communication module according to the capacitance measured by using the sensor module.

2. The electronic device of claim 1, wherein an impedance matching circuit is included between the first antenna and the first connector for matching impedances between the first antenna and the communication module.

3. The electronic device of claim 1, wherein the signal connection member includes a coaxial cable or a flexible PCB.

4. The electronic device of claim 1, wherein the signal connection member is configured to form a first signal path that transmits the at least one of the first wireless transmission signal and the first wireless reception signal through the first antenna to the communication module and provides a signal processed by the communication module to the first antenna.

5. The electronic device of claim 4, wherein the signal connection member is configured to form a second signal path that provides a sensing signal related to a unit time change value of a capacitance corresponding to a contact to the sensor module when the first antenna comes into contact with a human body of a user of the electronic device.

6. The electronic device of claim 1, wherein a first filter for filtering a noise signal transmitted from the first antenna to the sensor module is included between the second connector and the sensor module.

7. The electronic device of claim 6, wherein the sensor module comprises:
   a capacitance measurement unit configured to measure a unit time change value of the capacitance with respect to a path between the first antenna and the second connector transmitted through the signal connection member and transfer the measured capacitance unit time change value to the processor; and
   a sensing parameter adjusting unit configured to adjust the at least one sensing parameter based on at least one of the first wireless transmission signal and the unit time change value of the measured capacitance transmitted through the signal connection member.

8. The electronic device of claim 7, wherein the sensing parameter adjusting unit comprises a sensing cycle control module that varies a sensing period or a sensing frequency for recognizing a contact of the first antenna to correspond to frequency band information based on the frequency band information transmitted in real time through the processor.

9. The electronic device of claim 7, wherein the sensing parameter adjusting unit includes a second filter that filters the noise signal that is not removed through the first filter and adjusts a filtering setting value based on the frequency band information transmitted in real time through the processor.

10. The electronic device of claim 1, wherein the sensor module comprises a grip sensor or a touch sensor.

11. The electronic device of claim 1, wherein the processor comprises:
    a grip determination unit that transmits a unit time change value of capacitance for a path between the first antenna and the second connector through the signal connection member transmitted through the sensor module and determines whether the first antenna has been touched by a user of the electronic device based on a received capacitance change value per unit time;
    a frequency band transmitting unit that transmits frequency band information including a noise component to the sensor module in real time; and
    a transmission power control unit configured to control the communication module to control transmission power transmitted through the first antenna.

12. The electronic device of claim 1, further comprising a memory for storing a lookup table related to the at least one sensing parameter of the sensor module.

13. The electronic device of claim 12, wherein the memory stores software for controlling the sensor module through the processor to sense a grip state of the first antenna.

14. A method for controlling a transmission power of an electronic device, the method comprising:
    monitoring, by a processor, a contact state of a first antenna;
    setting, by the processor, at least one of a filtering setting value and a sensing period of a sensor module based on information of a frequency band in which communication is made through the first antenna;
    determining, by the processor, whether a human body of a user of the electronic device is in contact with the first antenna;
    removing, by the processor, a noise signal from a sensing signal related to at least one of a first wireless reception signal or a unit time change value of capacitance received through the first antenna using at least one of a first filter or a second filter when the human body of the user of the electronic device is in contact with the first antenna; and
    controlling, by the processor, a communication module to control transmission power transmitted through the first antenna.

15. The method of claim 14, wherein setting the at least one of the filtering setting value or the sensing period of the sensor module comprises:
    transmitting, by the processor, the information of the frequency band in which communication is made through the first antenna to the sensor module in real time;

retrieving, by the processor, setting information related to at least one sensing parameter of the sensor module from a memory; and setting, by the processor, at least one of a filtering configuration value or a sensing period corresponding to the setting information retrieved from the memory to the second filter.

16. The method of claim 14, wherein the sensor module comprises a sensing parameter adjusting unit that varies at least one of the sensing period or a sensing frequency for recognizing a contact of the first antenna to correspond to the information of the frequency band based on the information of the frequency band transmitted in real time through the processor.

17. The method of claim 14, wherein the second filter filters the noise signal that is not removed through the first filter and sets at least one of a filtering configuration value or the sensing period to be adjusted based on the information of the frequency band transmitted in real time through the processor.

18. The method of claim 14, wherein the processor comprises:

a grip determination unit that receives the unit time change value of the capacitance of the first antenna through the sensor module and determines whether the first antenna has been touched by a user of the electronic device based on the received unit time change value of the capacitance;

a frequency band transmitting unit that transmits the information of the frequency band including the noise signal to the sensor module in real time; and a transmission power control unit configured to control the communication module to control transmission power transmitted through the first antenna.

19. The method of claim 15, wherein the memory stores a lookup table related to the at least one sensing parameter of the sensor module.

20. The method of claim 19, wherein the memory stores software for controlling the sensor module through the processor to sense a grip state of the first antenna.

\* \* \* \* \*